(12) United States Patent
Bogart et al.

(10) Patent No.: US 7,413,132 B1
(45) Date of Patent: Aug. 19, 2008

(54) SPRAYER ASSEMBLY WITH ADJUSTABLE BOOM ARMS

(75) Inventors: Bruce E. Bogart, Georgetown, IN (US); Steven H. Taylor, Crestwood, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 281 days.

(21) Appl. No.: 11/379,121

(22) Filed: Apr. 18, 2006

Related U.S. Application Data

(60) Provisional application No. 60/673,977, filed on Apr. 22, 2005.

(51) Int. Cl.
*B05B 1/20* (2006.01)

(52) U.S. Cl. .................. 239/169; 239/163; 239/164; 239/167; 239/172; 239/175; 239/550

(58) Field of Classification Search .......... 239/159, 239/163, 164, 166, 167, 169, 172, 175, 550
See application file for complete search history.

(56) References Cited

U.S. PATENT DOCUMENTS

| | | | | |
|---|---|---|---|---|
| 2,596,473 A | * | 5/1952 | Essick | 239/172 |
| 3,447,750 A | * | 6/1969 | Weston | 239/167 |
| 5,184,775 A | * | 2/1993 | Kerber | 239/163 |
| 5,190,218 A | * | 3/1993 | Kayser et al. | 239/172 |
| 7,063,273 B2 | * | 6/2006 | Hahn et al. | 239/159 |
| 7,152,812 B1 | * | 12/2006 | Johnson | 239/164 |

OTHER PUBLICATIONS

AG Spray Equipment, Inc., Products Information, pp. 1-9, downloaded from http://www.agspray.com/TwelveVolt/LGATVsprayers.htm on Jul. 19, 2006.

* cited by examiner

*Primary Examiner*—Steven J Ganey
(74) *Attorney, Agent, or Firm*—Stites & Harbison, PLLC; David W. Nagle, Jr.; William C. Ferrell, Jr.

(57) ABSTRACT

A sprayer assembly includes a frame that supports a tank for storing a liquid chemical. A pump moves the liquid chemical from the tank to one or more spray nozzles through a flexible hose supported by a boom arm that is attached to and extends from the frame. To allow for adjustment of the positioning of the spray nozzles, the boom arm has a curved end portion that defines a slot. A fastener can be passed through the slot and into a corresponding opening defined in the frame to attach the boom arm to the frame. As such, the boom arm can be fixed at any orientation between 90° (vertical position) and 0° (horizontal position) depending on the application.

18 Claims, 2 Drawing Sheets

SPRAYER ASSEMBLY WITH ADJUSTABLE BOOM ARMS

CROSS REFERENCES TO RELATED APPLICATIONS

This application claims priority from U.S. Provisional Application Ser. No. 60/673,977 filed on Apr. 22, 2005, the entire disclosure of which is incorporated herein by this reference.

BACKGROUND OF THE INVENTION

The present invention relates to a sprayer assembly for the application of fertilizers, weed killers, insecticides, and/or other liquid chemicals to lawns and gardens.

In maintaining lawns and gardens, various types of liquid chemicals are commonly used, including fertilizers, weed killers, and insecticides. These liquid chemicals are often applied using a sprayer assembly of some sort. For example, the sprayer assembly may be comprised of a tank that is towed behind or carried on a tractor, powered lawn mower or all-terrain vehicle (ATV), along with one or more flexible hoses that deliver the liquid chemical to spray nozzles. Furthermore, the sprayer assembly may include a pump or similar means for moving the liquid through the flexible hoses from the tank to the spray nozzles.

In any event, the positioning of the spray nozzles is important to ensure appropriate application of the liquid chemical, and specifically, to ensure that there is appropriate coverage over the desired area. Accordingly, there is a need for a sprayer assembly in which the positioning of the spray nozzles can be readily adjusted.

SUMMARY OF THE INVENTION

The present invention meets the above-identified needs, and others, by providing a sprayer assembly with adjustable boom arms.

A sprayer assembly made in accordance with the present invention is designed to be towed behind a vehicle such as a tractor, a powered lawn mower or all-terrain vehicle (ATV). The sprayer assembly includes a frame that supports a tank for storing a liquid chemical, and includes wheels to engage and move over the underlying ground surface. The sprayer assembly further includes a pump that moves the liquid chemical through a flexible hose that, in one exemplary embodiment, terminates in a Y-coupler with integral valves that allow an operator to control flow of the liquid chemical into and through one or both of a pair of flexible hoses. Each of these flexible hoses is provided with spray nozzles that then deliver the liquid chemical to the desired area in a predetermined pattern.

To ensure appropriate application of the liquid chemical, the sprayer assembly further includes two boom arms attached to and extending from the frame. To allow for some adjustment of the positioning of the spray nozzles, each boom arm has a curved end portion that defines a slot. A fastener can be passed through each slot and into a corresponding opening defined in the frame to attach each boom arm to the frame. The opposite end of the fastener includes an adjustment knob, which facilitates the rotation and tightening or loosening of the fastener. Therefore, to reposition a boom arm, the associated adjustment knob is rotated and loosened so that the boom arm can be manipulated into a new orientation relative to the frame. The adjustment knob is then rotated and tightened to maintain the boom arm in the new orientation. As such, the boom arm can be fixed at any orientation between 90° (vertical position) and 0° (horizontal position) depending on the application.

DETAILED DESCRIPTION OF THE INVENTION

Figure 1:
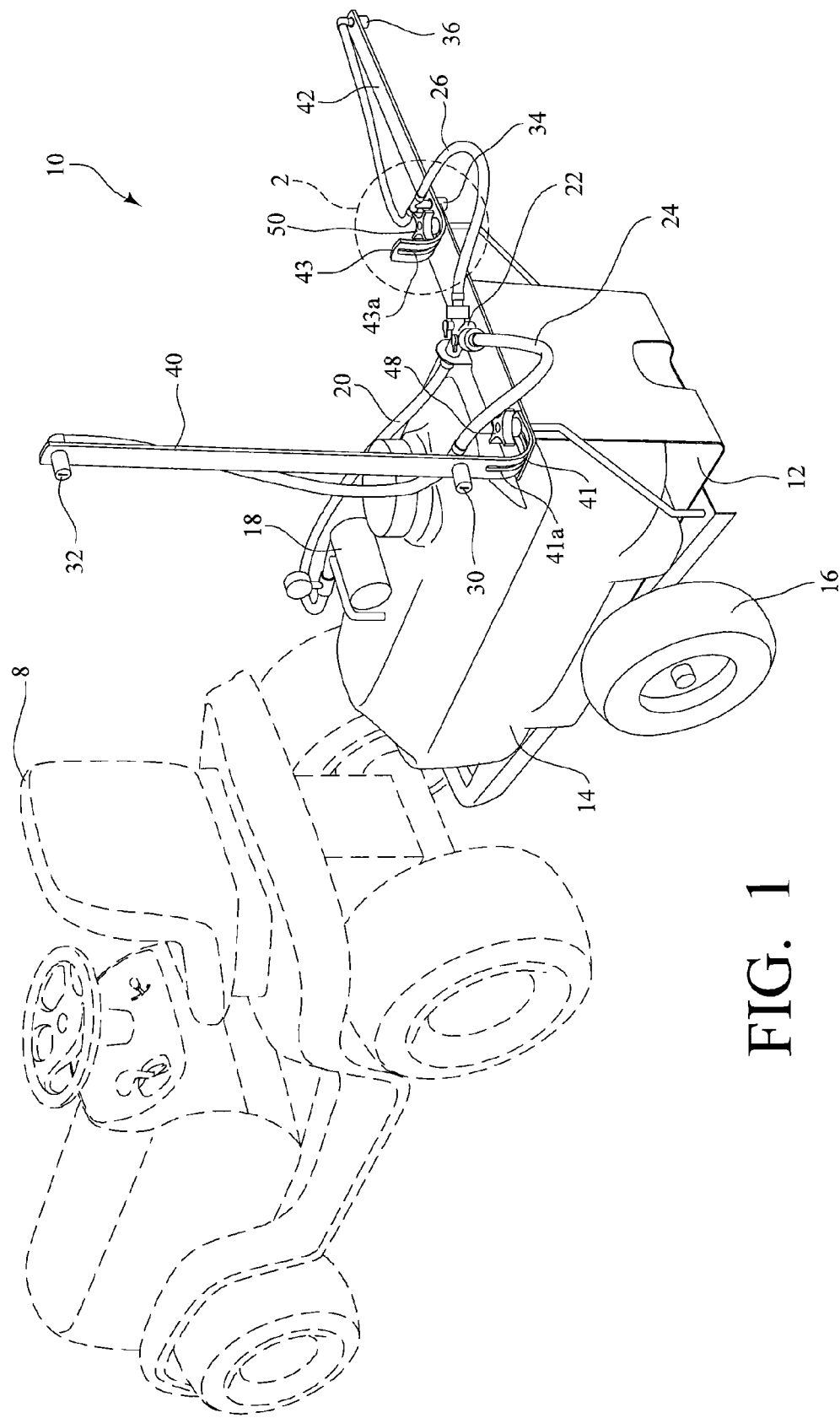
FIG. 1 is a perspective view of an exemplary sprayer assembly made in accordance with the present invention that is secured and towed behind a tractor.

The present invention is a sprayer assembly with adjustable boom arms. Referring first to FIG. 1, an exemplary sprayer assembly 10 is towed behind a tractor 8, although it could also be towed behind a different vehicle such as a powered lawn mower or all-terrain vehicle (ATV). As shown, the exemplary sprayer assembly 10 includes a frame 12 that supports a tank 14 for storing a liquid chemical. Of course, the frame 12 may also be integrated into the tank 14 without departing from the spirit and scope of the present invention. In any event, since this particular sprayer assembly 10 is designed to be towed behind a vehicle such as a tractor, powered lawn mower, or all-terrain vehicle (ATV), the frame 12 is also provided with wheels 16 to engage and move over the underlying ground surface.

In this exemplary embodiment, the sprayer assembly 10 further includes a pump 18 that moves the liquid chemical through a first flexible hose 20, which terminates in a Y-coupler 22 with integral valves that allow an operator to control flow of the liquid chemical into and through one or both of a pair of flexible hoses 24, 26. Each of these flexible hoses 24, 26 is provided with a pair of spray nozzles 30, 32, 34, 36, which then deliver the liquid chemical to the desired area in a predetermined pattern.

Of particular importance to the present invention, the sprayer assembly 10 further includes two boom arms 40, 42 attached to and extending from the frame 12. Each boom arm 40, 42 supports one of the flexible hoses 24, 26. Furthermore, as shown, the spray nozzles 30, 32, 34, 36 are respectively positioned near the respective ends of each boom arm 40, 42.

Figure 2:
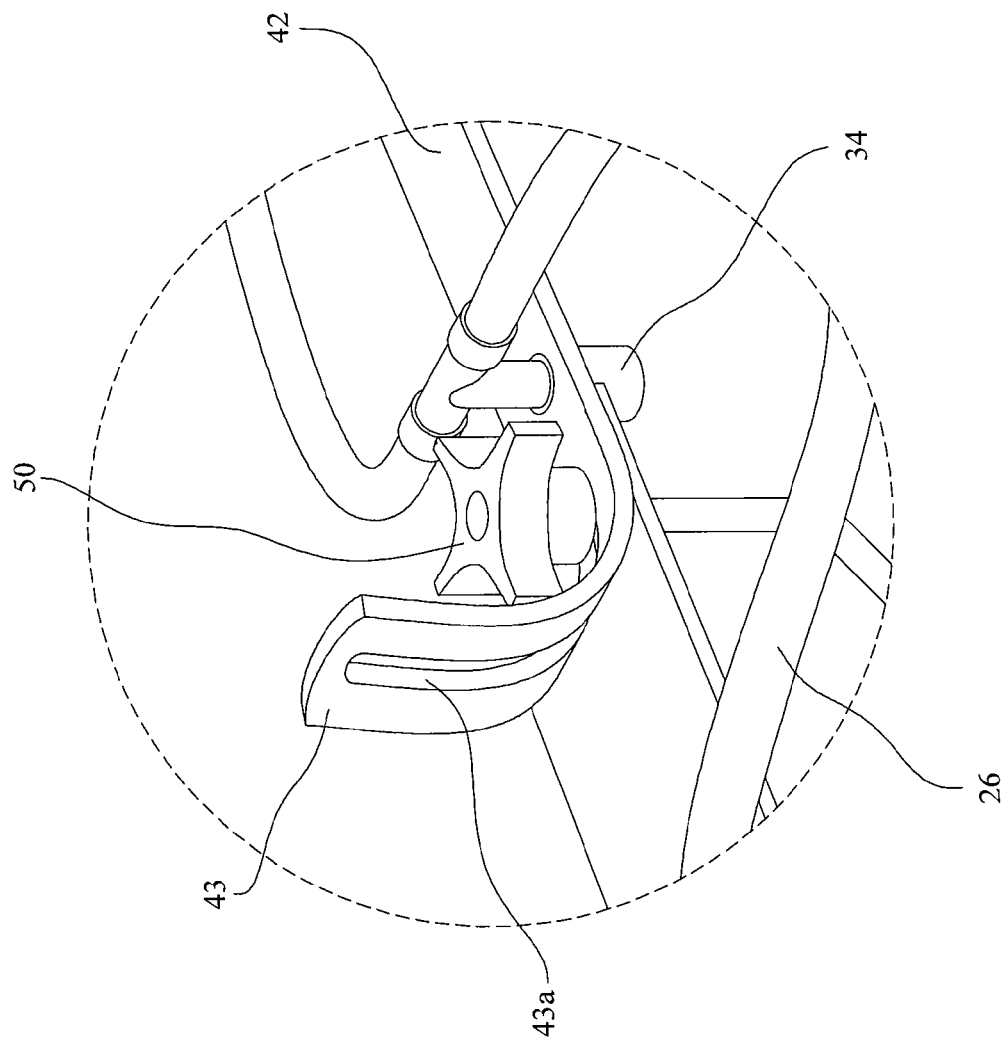
FIG. 2 is an enlarged perspective view of a curved end portion of a boom arm of the exemplary sprayer assembly of FIG. 1.

In any event, and as mentioned above, it would be desirable to allow for some adjustment of the positioning of the spray nozzles 30, 32, 34, 36. In this regard, each boom arm 40, 42 has an end portion 41, 43 that is curved to form an approximately 90° arc. A slot 41a, 43a is defined through each curved end portion 41, 43, perhaps as best seen in the enlarged view of FIG. 2, such that a bolt or similar fastener can be passed through each slot 41a, 43a and into a corresponding opening defined in the frame 12 to attach each boom arm 40, 42 to the frame 12. In this exemplary embodiment, the preferred fasteners are threaded bolts (not shown), the threaded ends of which pass through the respective slots 41a, 43a and into corresponding openings (not shown) defined in the frame 12. An adjustment knob 48, 50 is mounted to the opposite end of each threaded bolt, facilitating the rotation and tightening or loosening of each threaded bolt. For example, to reposition a boom arm 40, the adjustment knob 48 is rotated and loosened so that the boom arm 40 can be manipulated into a new orientation relative to the frame 12. The adjustment knob 48 is then rotated and tightened to maintain the boom arm 40 in the new orientation.

Referring again to FIG. 1, it can be seen that the first boom arm 40 has been oriented in a substantially vertical position, where the nozzles 30, 32 spray outwardly, for example, when the sprayer assembly 10 is used to apply fertilizers or other liquid chemicals to crop rows. At the same time, the second boom arm 42 has been oriented in a substantially horizontal position where the nozzles 34, 36 spray downwardly toward the underlying ground surface. Because of the curved end portions 41, 43, each boom arm 40, 42 can be fixed at any orientation between 90° (vertical position) and 0° (horizontal position) depending on the application.

One of ordinary skill in the art will recognize that additional embodiments are also possible without departing from the teachings of the present invention or the scope of the claims that follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A sprayer assembly, comprising:
   a frame;
   a tank supported on said frame and storing a liquid chemical;
   one or more spray nozzles; and
   at least one hose for delivering the liquid chemical from the tank to said one or more spray nozzles, each said hose being mounted on and supported by a boom arm attached to and extending from said frame, said boom arm adapted to be fixed at a selected orientation relative to the frame, and said boom arm including: a curved end portion, a slot defined by said curved end portion, and a fastener passing through said slot and into a corresponding opening defined in the frame to attach said boom arm to the frame.

2. The sprayer assembly as recited in claim 1, wherein said boom arm is adapted to be fixed at a selected orientation between a substantially horizontal position relative to the frame and a substantially vertical position relative to the frame.

3. The sprayer assembly as recited in claim 1, wherein an adjustment knob is mounted to an end of said fastener to facilitate the rotation and tightening or loosening of said fastener.

4. The sprayer assembly as recited in claim 1, wherein a first spray nozzle is positioned near one end of the boom arm, and a second spray nozzle is positioned near an opposite end of the boom arm.

5. The sprayer assembly as recited in claim 1, wherein said sprayer assembly includes two boom arms and two hoses, each such hose mounted on and supported by a respective boom arm.

6. The sprayer assembly as recited in claim 5, wherein two spray nozzles are associated with each boom arm.

7. The sprayer assembly as recited in claim 6, wherein a first spray nozzle is positioned near one end of each boom arm, and a second spray nozzle is positioned near an opposite end of each boom arm.

8. The sprayer assembly as recited in claim 1, wherein the liquid chemical is delivered from the tank to said one or more spray nozzles by a pump.

9. A sprayer assembly, comprising:
   a frame;
   a tank supported on said frame and storing a liquid chemical;
   one or more spray nozzles; and
   at least one hose for delivering the liquid chemical from the tank to said one or more spray nozzles, each said hose being mounted on and supported by a boom arm having a curved end portion defining a slot, said boom arm being attached to the frame at said curved end portion by a fastener passing through said slot and into a corresponding opening defined in the frame, such that said boom arm can be fixed at a selected orientation relative to the frame.

10. The sprayer assembly as recited in claim 9, wherein said boom arm is adapted to be fixed at a selected orientation between a substantially horizontal position relative to the frame and a substantially vertical position relative to the frame.

11. The sprayer assembly as recited in claim 9, wherein an adjustment knob is mounted to an end of said fastener to facilitate the rotation and tightening or loosening of said fastener.

12. The sprayer assembly as recited in claim 9, wherein a first spray nozzle is positioned near one end of the boom arm, and a second spray nozzle is positioned near an opposite end of the boom arm.

13. The sprayer assembly as recited in claim 9, wherein the liquid chemical is delivered from the tank to said one or more spray nozzles by a pump.

14. A sprayer assembly, comprising:
   a frame;
   a tank supported on said frame and storing a liquid chemical;
   at least two boom arms, each said boom arm attached to and extending from said frame, each said boom arm adapted to be fixed at a selected orientation relative to the frame, and said boom arm including: a curved end portion, a slot defined by said curved end portion, and a fastener passing through said slot and into a corresponding opening defined in the frame to attach said boom arm to the frame;
   one or more spray nozzles associated with each boom arm; and
   at least two hoses for delivering the liquid chemical from the tank to the spray nozzles associated with each said boom arm, each such hose being mounted on and supported by one of said boom arms.

15. The sprayer assembly as recited in claim 14, wherein each said boom arm is adapted to be fixed at a selected orientation between a substantially horizontal position relative to the frame and a substantially vertical position relative to the frame.

16. The sprayer assembly as recited in claim 14, wherein an adjustment knob is mounted to an end of said fastener to facilitate the rotation and tightening or loosening of said fastener.

17. The sprayer assembly as recited in claim 14, wherein two spray nozzles are associated with each said boom arm.

18. The sprayer assembly as recited in claim 17, wherein a first spray nozzle is positioned near one end of each said boom arm, and a second spray nozzle is positioned near an opposite end of each said boom arm.

* * * * *